Feb. 4, 1930.                C. B. WHITE                1,746,097
                         MILK BOTTLE CAP REMOVER
                            Filed Feb. 6, 1929
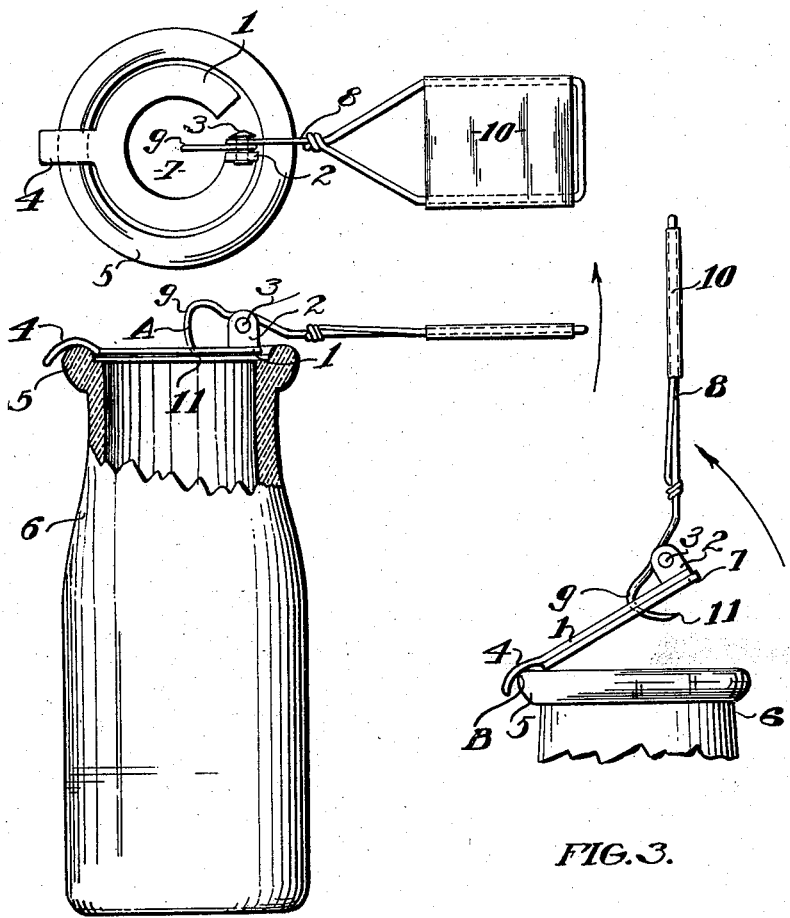
INVENTOR.
CHARLES B. WHITE
BY
U. G. Charles
ATTORNEY.

Patented Feb. 4, 1930

1,746,097

UNITED STATES PATENT OFFICE

CHARLES B. WHITE, OF TOPEKA, KANSAS

MILK-BOTTLE-CAP REMOVER

Application filed February 6, 1929. Serial No. 337,860.

My invention relates to a device for removing milk bottle caps.

The object of my invention is to provide a device adaptable to the top of a milk bottle as commonly used for the purpose of removing the pasteboard disc or cap from the mouth of the bottle by the operation of the component members of the device.

A still further object of my invention is to provide a removing means arranged to pierce the disc or cover of a milk bottle to remove it from the mouth of the bottle in a convenient manner.

A still further object of my invention is to provide an annular member or ring having mounted thereupon a lever arranged at one end to pierce and grip the cap on a milk bottle for the purpose of removal and the annular ring acting as a base for the operation of the lever.

Another object of my invention is to provide an extension on the base member of the device to act in the manner of a hinge or rockable support on the lip of the bottle during the operation of removing the cap.

These and other objects will be hereinafter more fully explained, reference being had to the accompanying drawings forming a part of this specification wherein like characters will apply to like parts throughout the different views.

Referring to the drawings:

Fig. 1 is an elevation of the mechanism in position on a capped milk bottle, the milk bottle being partly in section.

Fig. 2 is a plan elevation of Fig. 1.

Fig. 3 illustrates the mechanism in the operation of removing the cap from the mouth of the bottle.

An annular base member 1 is formed substantially as shown and has, at an interrupted portion, the vertical extension 2 in which is rigidly affixed the pin 3. Diametrically opposite to the vertical extension 2 and on the periphery of the said base member and integral therewith is formed a member 4 extending outward from the base member and being curved in the manner shown to approximately coincide with the surface of the lip 5 of the milk bottle 6, the base 1 resting as indicated in Fig. 1 and Fig. 2 upon the pasteboard disc or cover 7. A lever 8 formed in the manner shown and rockably positioned on the pin 3 has at one end a hook 9 and at the other end a handle 10 comprising a piece of sheet metal crimped around the lever 8. The hook 9 has at its lower extremity a point 11 which point is preferably needle sharp. The portion of the hook 9 indicated at A is curved on a radius whose center corresponds to the center of the pin 3.

The device is placed in position on the cap of a milk bottle as illustrated in Figs. 1 and 2 and the operation of removing the cap is performed by first holding the base 1 in position on the cap and rocking the handle 10 in the direction indicated by the arrow thereby causing the point 11 to pierce the cap 7. The operation is then completed by a continuance of the movement of the handle 10 and at the same time releasing the base 1 to rock on the lip of the cap as shown at B by reason of the member 4 and the cap 7 is removed from the mouth of the bottle.

This operation may be performed with one hand by grasping the handle 10 between the thumb and forefinger and allowing the other fingers to create the pressure on the base 1 until the hook has pierced the cap whereupon the further rocking of the lever completes the operation.

The base 1 may be fabricated of wire instead of sheet metal as shown and the lever 8 and handle 10 with the hook 9 may be fabricated from stock metal instead of wire and sheet metal as shown.

This device is very simple in its operation and can be handled quite skillfully after a small amount of practice.

The handle 10 as shown in the accompanying illustrations may be used for advertising purposes, name plates, and the like.

I do not wish to be restricted to any particular type of material or manner of fabrication and such modifications may be employed as lie within the scope of the appended claim.

What I do claim as new and desire to secure by Letters Patent is:

In a mechanism of the kind described, a base plate formed of an annular rim having a lateral extension thereon and diametrically positioned from the said lateral extension, a vertical extension, a hook member pivotally positioned on the vertical extension, the said plate, when in use, resting upon the cap of a milk bottle and the said hook formed to pierce and raise first one edge of the cap in the removal of the cap from the bottle substantially as shown.

In testimony whereof I affix my signature.

CHARLES B. WHITE.